(12) United States Patent
Baldasare et al.

(10) Patent No.: US 9,565,565 B2
(45) Date of Patent: Feb. 7, 2017

(54) SYSTEM AND METHOD FOR PROVIDING PHOTOVERIFICATION TO MOBILE DEVICE CHARGING STATIONS

(71) Applicants: Douglas Baldasare, Philadelphia, PA (US); Sheri Tate, San Jose, CA (US); Robert Kay, Cinnaminson, NJ (US); Jens Horstmann, Santa Clara, CA (US); Colin Nolan, North Wales, PA (US); Beth Pondo, New York, NY (US)

(72) Inventors: Douglas Baldasare, Philadelphia, PA (US); Sheri Tate, San Jose, CA (US); Robert Kay, Cinnaminson, NJ (US); Jens Horstmann, Santa Clara, CA (US); Colin Nolan, North Wales, PA (US); Beth Pondo, New York, NY (US)

( * ) Notice: Subject to any disclaimer, the term of this patent is extended or adjusted under 35 U.S.C. 154(b) by 0 days.

(21) Appl. No.: 14/842,689

(22) Filed: Sep. 1, 2015

(65) Prior Publication Data

US 2016/0165443 A1 Jun. 9, 2016

Related U.S. Application Data

(63) Continuation-in-part of application No. 14/095,866, filed on Dec. 3, 2013.

(Continued)

(51) Int. Cl.
| | |
|---|---|
| *H04M 3/16* | (2006.01) |
| *H04W 12/06* | (2009.01) |
| *H04W 4/02* | (2009.01) |
| *G08B 21/18* | (2006.01) |
| *H04M 1/725* | (2006.01) |

(52) U.S. Cl.
CPC ............ *H04W 12/06* (2013.01); *G08B 21/182* (2013.01); *H04M 1/72522* (2013.01); *H04W 4/023* (2013.01); *H04W 4/02* (2013.01)

(58) Field of Classification Search
USPC .... 455/411, 41.2, 566; 340/5.7, 10.4, 539.3, 340/636.1
See application file for complete search history.

(56) References Cited

U.S. PATENT DOCUMENTS

| | | | | |
|---|---|---|---|---|
| 6,323,775 | B1 * | 11/2001 | Hansson | H02J 7/0047 235/384 |
| 2004/0110535 | A1 | 6/2004 | Koskelainen et al. | |

(Continued)

*Primary Examiner* — David Q Nguyen
(74) *Attorney, Agent, or Firm* — Barnes & Thornburg LLP; Thomas J. McWilliams

(57) ABSTRACT

Systems and methods for locating and providing public mobile device charging stations are disclosed. One or more charging stations may be configured to charge a battery of a mobile device. A database may be configured to store location information of the one or more charging stations as well as mobile device location and security credential information of the one or more respective mobile devices. A server communicatively coupled with the one or more charging stations and the database, may be configured to determine a proximity of the one or more charging stations to a location of the mobile device. This determination may be based on the station location information and the mobile device location information. Based on the determined proximity, provide the station location information of the respective one or more charging stations to the mobile device. The charging station further provides photo and/or video surveillance security to verify a user.

10 Claims, 25 Drawing Sheets

Related U.S. Application Data

(60) Provisional application No. 61/732,731, filed on Dec. 3, 2012.

(56) References Cited

U.S. PATENT DOCUMENTS

| | | | | |
|---|---|---|---|---|
| 2009/0187623 | A1 | 7/2009 | Narayanaswami et al. | |
| 2010/0041333 | A1* | 2/2010 | Ungari | H02J 7/00 455/41.2 |
| 2010/0066507 | A1* | 3/2010 | Myllymaki | G06F 21/31 340/10.4 |
| 2010/0109890 | A1* | 5/2010 | Montplaisir | H02J 7/0054 340/636.1 |
| 2012/0252532 | A1* | 10/2012 | Williams | H04M 1/04 455/566 |
| 2012/0280784 | A1* | 11/2012 | Gaviria Velez | H04M 1/72522 340/5.7 |
| 2013/0038519 | A1 | 2/2013 | Bi et al. | |
| 2013/0162430 | A1* | 6/2013 | Scherzer | G08B 21/24 340/539.13 |
| 2013/0227694 | A1* | 8/2013 | Weinstein | G06F 21/577 726/25 |
| 2014/0070774 | A1* | 3/2014 | Terlizzi | H02J 7/0004 320/162 |

* cited by examiner

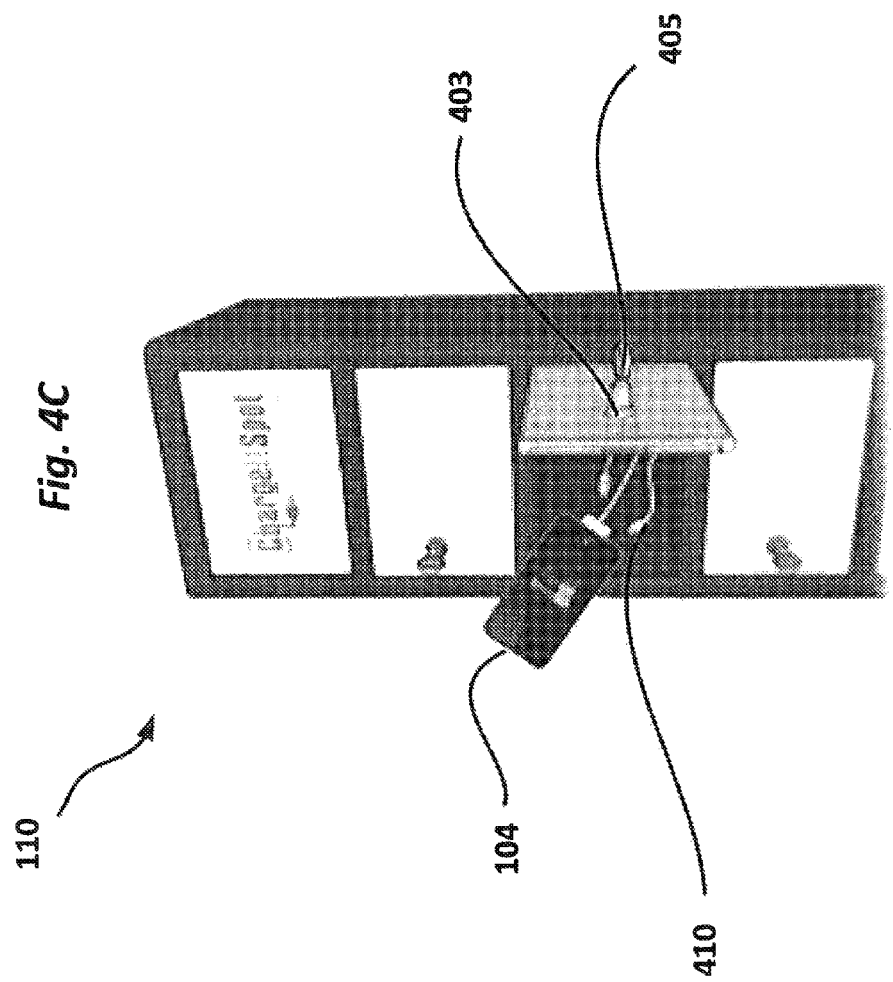

SYSTEM AND METHOD FOR PROVIDING PHOTOVERIFICATION TO MOBILE DEVICE CHARGING STATIONS

PRIORITY

This application is a continuation-in-part of U.S. patent application Ser. No. 14/095,866, filed Dec. 3, 2013, which claims priority to U.S. Provisional Patent Application No. 61/732,731, filed Dec. 3, 2012, which are hereby incorporated by reference in their entireties.

FIELD OF THE INVENTION

The instant disclosure relates to mobile device charging, and, in particular, to systems and methods for providing photoverification to public or private mobile device charging stations.

BACKGROUND OF THE INVENTION

Mobile devices, such as cellular phones, personal digital assistants, tablets, and the like, are now widely used and heavily depended upon for voice and data communications. In order to maintain proper power levels for the operation of the device, the battery of the mobile device needs to be recharged from time to time. Often, at inopportune times, mobile device users may be located at public locations without the ability to recharge the mobile device battery. Even with the existence of public mobile device charging stations, these stations are limited in number and location. Consequently, a mobile device user runs the risk of his mobile device battery being exhausted before locating an available station to recharge the mobile device.

BRIEF DESCRIPTION OF THE FIGURES

Understanding of the present invention will be facilitated by consideration of the following detailed description of the preferred embodiments of the present invention taken in conjunction with the accompanying drawings, in which like numerals refer to like parts:

FIG. 4C illustrates an example of an open locker of a mobile device charging station according to embodiments of the present invention;

SUMMARY OF THE INVENTION

Figure 1:
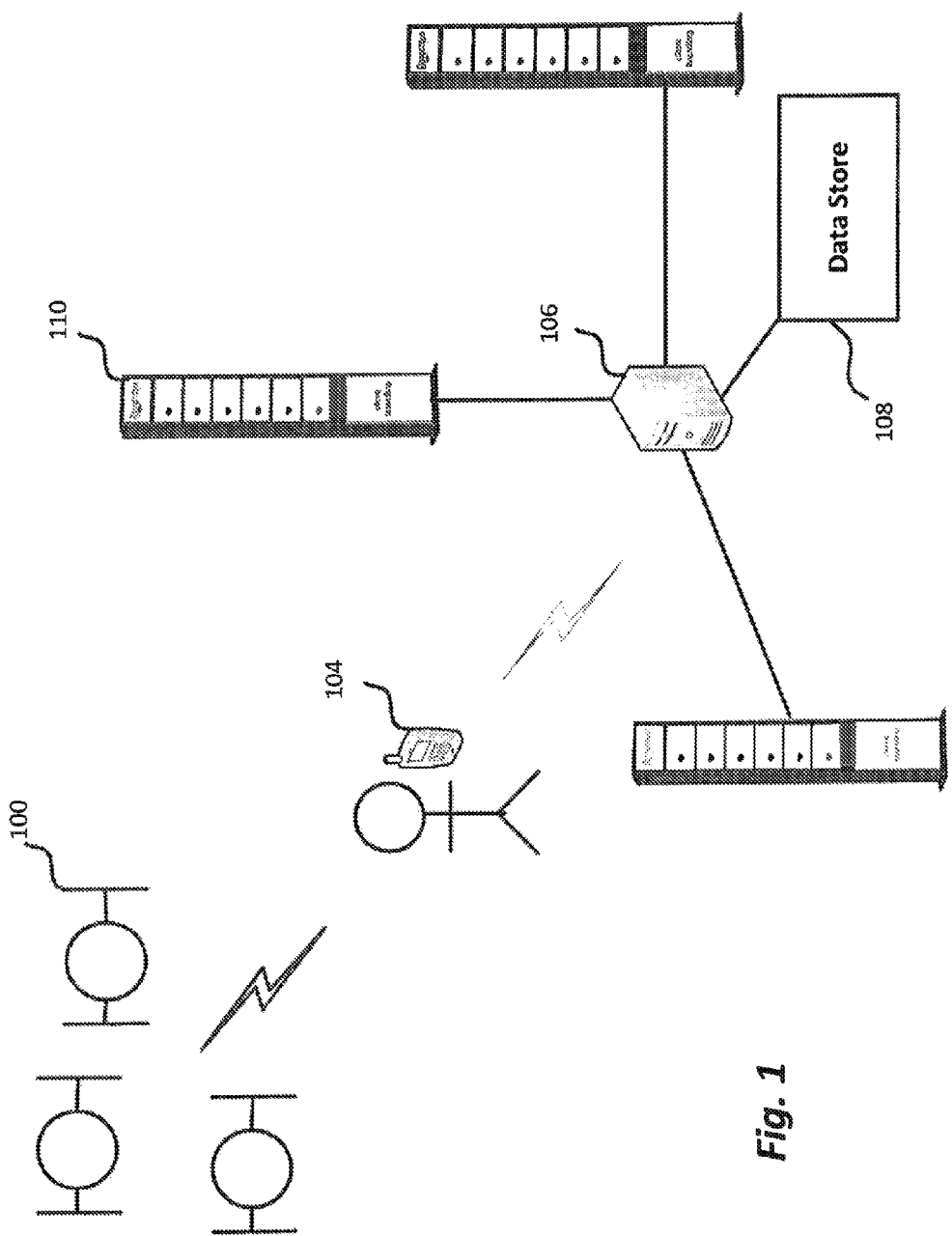
FIG. 1 illustrates a diagram of a system according to embodiments of the present invention.

The present disclosure provides systems and techniques for providing and locating public mobile device charging stations.

In embodiments of the present invention, one or more charging stations may be configured to charge a battery of a mobile device. A database may be configured to store location information of the one or more charging stations, as well as mobile device location, charge, and/or other information of the one or more respective mobile devices. A server communicatively coupled with the one or more charging stations and the database may be configured to determine a proximity of the one or more charging stations to a location of the mobile device. This determination may be based on the station location information and the mobile device location information. Based on the determined proximity, the server may provide the station location information of a respective one or more charging stations to the mobile device.

The server and/or mobile application may also monitor a power level of the battery of the mobile device. Based on the power level of the battery of the mobile device, the user may be alerted, and provide location information of the respective one or more charging stations to the mobile device.

Thereby, the invention may provide a system and method to alert a user of the locations of nearby publicly available public or private charging stations to charge his mobile device when the battery power level of his mobile device decreases to a low level. Moreover, the disclosed system and method also provide a system and method that provides: advertising opportunities for retailers; the ability for retailers to drive traffic to a store or stores; a mobile application—such a mobile application might indicate and/or suggest charging station locations, and/or monitor a user's use and the correspondent battery charge; and the like

DETAILED DESCRIPTION OF THE PREFERRED EMBODIMENTS

It is to be understood that the figures and descriptions of the present invention have been simplified to illustrate elements that are relevant for a clear understanding of the present invention, while eliminating, for the purpose of clarity, many other elements found in typical network systems, mobile devices, telecommunications servers and telecommunications generally, and associated methods. Those of ordinary skill in the art may recognize that other elements and/or steps are desirable and/or required in implementing the present invention. However, because such elements and steps are well known in the art, and because they do not facilitate a better understanding of the present invention, a discussion of such elements and steps is not provided herein. The disclosure herein is directed to all such variations and modifications to the disclosed elements and methods known to those skilled in the art.

It would be advantageous for a user to use a system to be alerted of the locations of nearby publicly available public or private charging stations to charge his mobile device when the battery power level of his mobile device decreases to a low level. It would be particularly advantageous if such a system and method also provided: advertising opportunities for retailers; the ability for retailers to drive traffic to a store or stores; a mobile application, such as a mobile application that would indicate and/or suggest charging station locations, and/or that would monitor a user's use and the correspondent battery charge; and the like.

Mobile devices, such as cellular phones, personal digital assistants, tablets, and the like are now widely used and heavily depended upon for voice and data communications. In order to be operational, mobile devices typically employ the use of rechargeable batteries. These batteries need to be recharged from time to time in order to maintain proper power levels for the operation of the mobile device. For example, some estimate that the typically user runs low on battery power in a mobile device approximately 4 times each week.

Because a conventional charger generally utilizes alternating current, and specifically typically uses either 110V or 220V "household" current designed for indoor use, it is often difficult to recharge a mobile device battery in a public place or while traveling without access to a suitable power terminal. Further, even in the case of an available power terminal, such charging would require the user to also be traveling with a charger, which may be inconvenient or easily forgotten. Similarly, while outside and/or travelling in a vehicle, the user may need to have his or her charger available (particularly, a charger that is adapted for the specific device brand and model) in order to use a vehicle's electrical power supply. Thus, public mobile device charging systems suitable for charging mobile devices are highly beneficial.

However, although public charging stations are known, and due in part to the ubiquity of mobile device users and the currently limited number of publicly available mobile device charging stations, mobile device users may still have great difficulty locating a public charging station available for use. Consequently, a mobile device user runs the risk of his mobile device battery being exhausted before locating an available station to recharge the mobile device.

Therefore, the present invention provides for a user to be alerted of the locations of available public charging stations when the battery power level of his mobile device decreases to a low level. In particular, when the battery power of the mobile device decreases below a predetermined threshold level (for example, 20% of its maximum power), the mobile device may request, from the server, information of one or more registered businesses, i.e., any place of business that includes a charging unit, that house a charging station within a specified distance from the mobile device. The disclosed system and method also provide: advertising opportunities for retailers; the ability for retailers to drive traffic to a store or stores; a mobile application, such as a mobile application that would indicate and/or suggest charging station locations, and/or that would monitor a user's use and the correspondent battery charge; and the like With reference to FIG. 1, GPS satellites (or other known mobile device locating technologies, such as triangulation) 100 operate to determine a location of a mobile device 104 that contains features, some of which features may be available based upon the location data. As used herein, mobile device 104 may refer to cellular phones, personal digital assistants, tablets, and the like. The mobile device 104 may determine its location through the use of received GPS signals, or through the use of a filter which may combine location data from the GPS signals and/or from another system, such as cell-tower-triangulation or a WLAN system in order to obtain a location or a more accurate location. The mobile device 104 may be wirelessly coupled to server 106. The server 106 may be communicatively coupled to a datastore 108, as well as to a plurality of charging stations 110.

According to certain embodiments of the present invention, the server 106 periodically receives and stores location information associated with the mobile device 104. This location information may be sent from the mobile device 104; pulled from the mobile device 104; or obtained from another service that is able to determine the location of the mobile device (e.g., Location Based Services (LBS), Assisted GPS (A-GPS), eGPS, GSM Localization, Multilaterilization, Radiolocation, Trilateration, etc.).

For example, many public areas may provide Wi-Fi access points that consumers are allowed to utilize. These access points may also be used to help ascertain the location of a user or his relation to publicly available charging stations. For example, a Skyhook Wireless system may be used. This location information may be analyzed independent of or in conjunction with other forms of information or location information. For example, Wi-Fi location information may be particularly useful in certain indoor environments where other technologies (e.g. GPS) may have more difficulty functioning, such as in a shopping mall housing a collection of retail businesses.

Embodiments of the present invention allow a mobile device user (which may become registered with the system upon using the charging station 110 for the first time) to be alerted of the locations of available public charging stations when the battery power level of his mobile device decreases, such as to a predetermined threshold level, which may be automatically set or which may be previously set by the user. Accordingly, when the battery power of the mobile device decreases below this predetermined threshold level (for example, 20% of its maximum power), the mobile device may request, from the server, information of one or more registered businesses housing a charging station within a specified distance from the mobile device. Alternatively, the location information of the mobile device may be sent to the server and compared with: the location information of one or more of the registered businesses housing a charging station; a list or a preferential list of registered businesses housing a charging station; a list of registered businesses having charging stations and making offers to consumers that those businesses wish to be known to the consumers; and the like.

By way of non-limiting example only, a mobile device user may be out in public, shopping. Becoming occupied with his shopping, the user may forget or neglect to check the battery power level of his mobile device. The system and method, according to embodiments of the present invention, may notify the user via his mobile device that the battery power of the device is indeed low, and then may display to the user a nearby store which houses a charging station, and that has a charging unit, such as a charging "locker," available. In an embodiment of the present invention, the mobile device app may display the number of charging stations available so a user does not waste time going to a charging station that does not have any ports available By being timely notified by the mobile device associated with the disclosed system and method, the user may have enough time to locate and subsequently recharge his mobile device battery for continued use of his mobile device without having to cut short his shopping experience or risk losing operation of his mobile device. As a substantial benefit to a registered business housing the charging station, the business may experience increased consumer traffic, as potential consumers enter the business to recharge their phone, and the opportunity to make targeted enticements to consumers having a known location proximate to the registered business.

Figure 2:
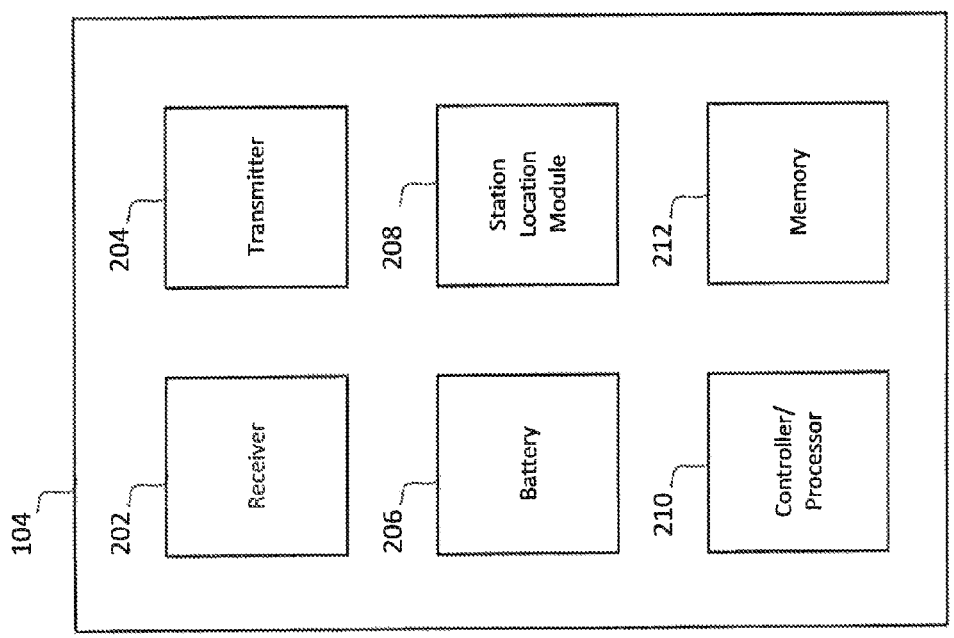
FIG. 2 illustrates a block diagram of a mobile device according to embodiments of the present invention.

FIG. 2 shows a block diagram of a mobile device 104 according to an embodiment. Within the mobile device 104, a receiver 202 may receive signals transmitted from GPS satellites, cell-towers, and/or access points for WLAN communication. A transmitter 204 may transmit signals including location information to the remote server or other access points. Power is provided to the various components of the mobile device 104 through battery 206. A station location module 208 may monitor a power level of the battery 206, and, based on the power level, the station location module 208 may provide station location information to the user of the mobile device 104. It should be noted that the station location module 208 may be able to monitor other functions and features of the mobile device as well. This information may be stored in one or more of databases described in datastore 108. The various modules within the mobile device 104 may operate as described hereinthroughout. A controller/processor 210 may direct the operation of various modules within mobile device 104, such as by execution of software program code to perform the functions discussed hereinthroughout. A memory 212 may store data and program codes for mobile device 104.

Figure 3:
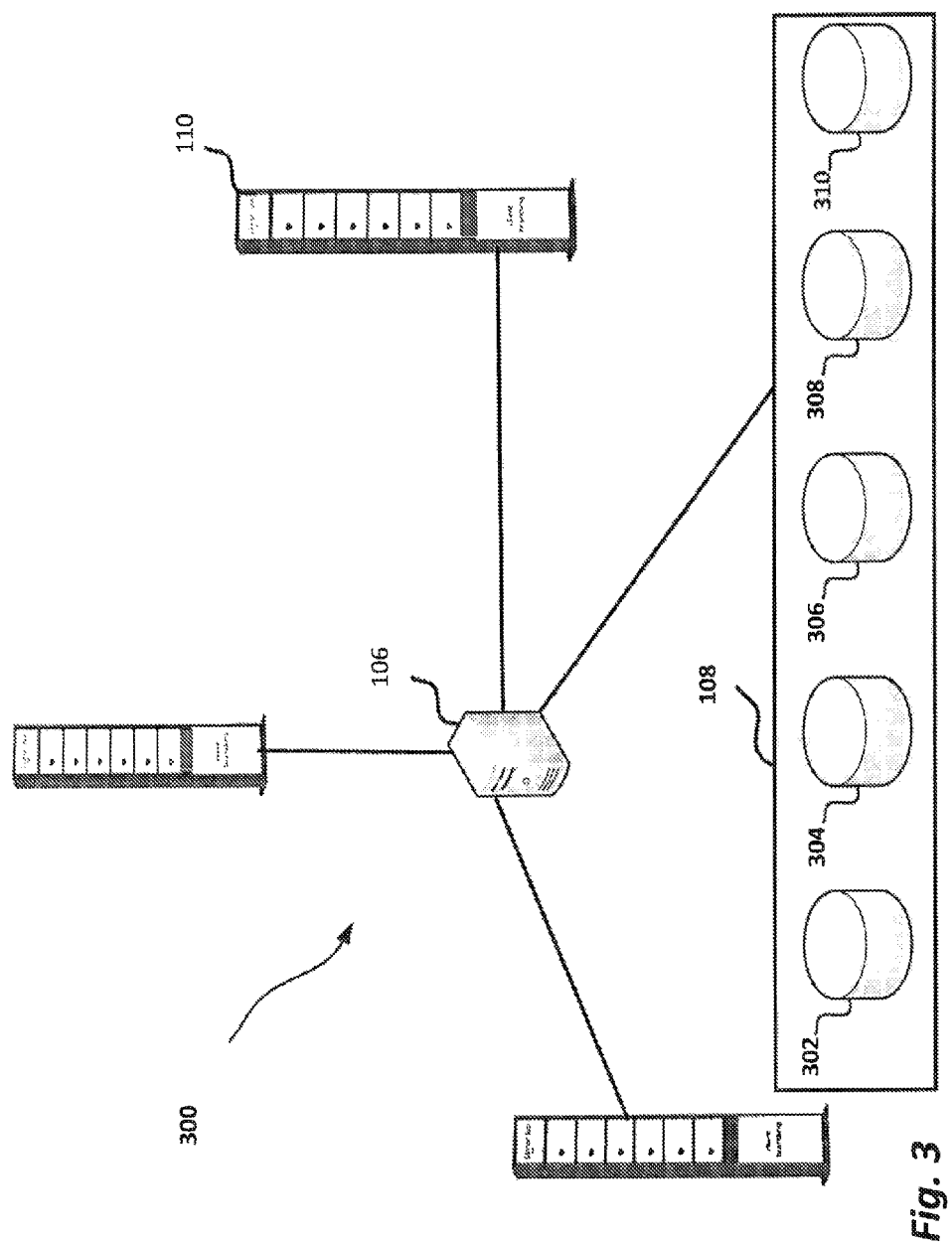
FIG. 3 illustrates a block diagram of a system according to embodiments of the present invention.

FIG. 3 shows a block diagram of a system 300 according to embodiments of the present invention. The system 300 comprises one or more charging stations 110, server 106 and data store 108. In certain embodiments of the present invention, the server 106 performs the tasks of providing charging station information to the mobile device. This charging station information may include geographical locations and/or directions to one or more respective charging stations and registered businesses in which these charging stations are housed or otherwise associated. This charging station information may also include advertisements or other types of information related to the associated businesses. This charging station information, among other types of information, is stored in one of the various databases 302-308 in data store 108. It should be noted that the various databases 302-308 shown in data store 108 may be organized as separate databases, portions of a single database, or by any other logical structure appropriate for storing the data.

As illustrated in FIG. 3, data store 108 stores user information in user database 302. This information may include shopping habits, websites visited or frequently visited by the device, mobile application on or frequently used on the device, charging stations used or frequently used by the device, and the like, for a user of the mobile device 104. For example, this information may include a number of times a particular user visited a certain store, a length of time the user shopped in the store, a number of coupons the user may have redeemed in that store, as well as any other user data reflecting the shopping behavior of a customer.

A map database 304 may also be included. This database 304 may provide the background maps that are displayed on each user's mobile device and that correspond to an area or region around the user at the time the application is invoked (i.e., when the user's mobile device battery is low). For example, a map tile of the United States may provide an image of the continental U.S. that can be zoomed to display a regional street level map for any area in the U.S. The map may further be zoomed to display locations within a venue housing a collection of businesses. For example, a user may be located within a mall, and the application may be invoked due to his mobile device battery being low. The mobile device 104 may display locations of retail stores within the mall which house available charging stations to charge the user's mobile device, either upon zooming in on the application by the user, or by a predetermined setting for displaying a location.

A location database 306 may store geographic locations of charging stations and/or geographic locations of mobile devices 104. A charging station database 308 may store the current status of available lockers within any charging stations. This status may include a number of lockers of a particular charging station not currently in use, or, available, for charging. The data store 108 may also comprise a registered business database 310, which may store information related to businesses currently registered with the charging system according to embodiments of the present invention. For example, the business database 310 may include approved advertisements, or associated content describing respective registered businesses.

Figure 4A:
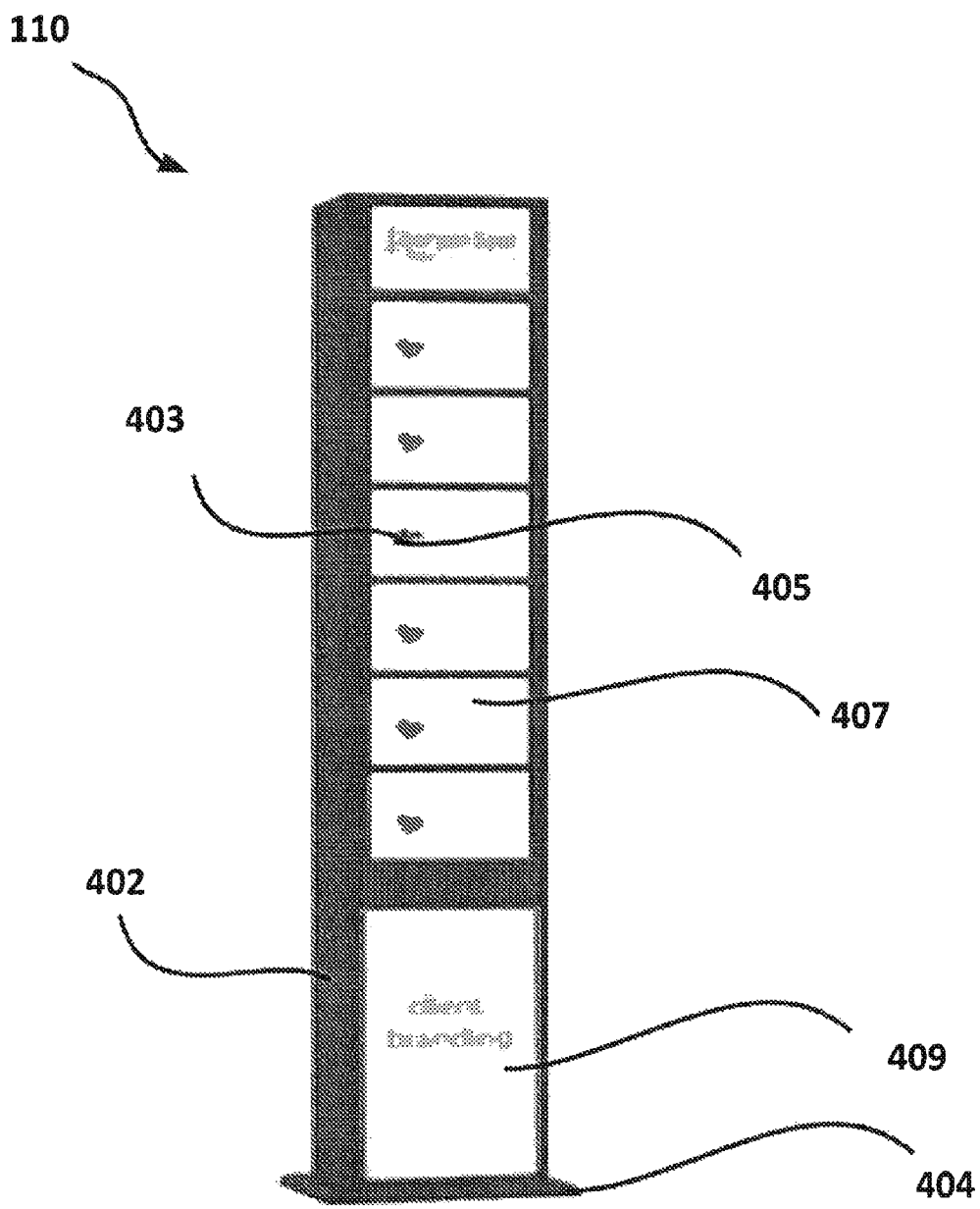
FIG. 4A illustrates an example of a mobile device charging station according to embodiments of the present invention.

FIG. 4A illustrates a mobile device charging station 110 according to embodiments of the present invention. This station 110 may be located in a retail store, building lobby, or any other location suitable for public accessibility. Station 110 includes a housing 402 mounted on a support 404. Embodiments may also include, on a face of the charging station 110, branding space 409 for a registered business to provide information about its business, which may include, by non-limiting example, advertisements, coupons, or any other suitable content related to its business. Each housing 402 may comprise one or more lockers 407, preferably having resident therein supplied power, such as a plurality of charging cords or other wireless charging options, such as supplied power having different plugs, power mats, or like proprietary or third party charging formats for mating to different mobile devices, such as USB plugs, micro- and mini-USB plugs, laptop tip plugs, and/or one or more proprietary plugs, such as plugs for an iPhone 3, 4 or 5. It should be understood that housing 402, support 404, locker 407, and branding space 409 may have any desired dimension or configuration, depending, at least in part, on the particular location of the station 110, and that the overall design of station 110 shown in FIG. 4 is for exemplary purposes only.

Different mechanisms may be mounted on the housing 402 to enable a user to access, lock, and subsequently unlock an individual locker 407 for charging his mobile device 104. These different mechanisms may allow the system 300 to gather varying amounts of user information referred to above (which may be stored in user database 302). For example, a simple lock 403 and physical key 405, as known to those of ordinary skill in the art, may be employed, which may not facilitate much interaction by the user with the charging station, and which consequently may limit consumer information able to be gathered by the charging station 110 for return to the system 300.

Figure 4B:
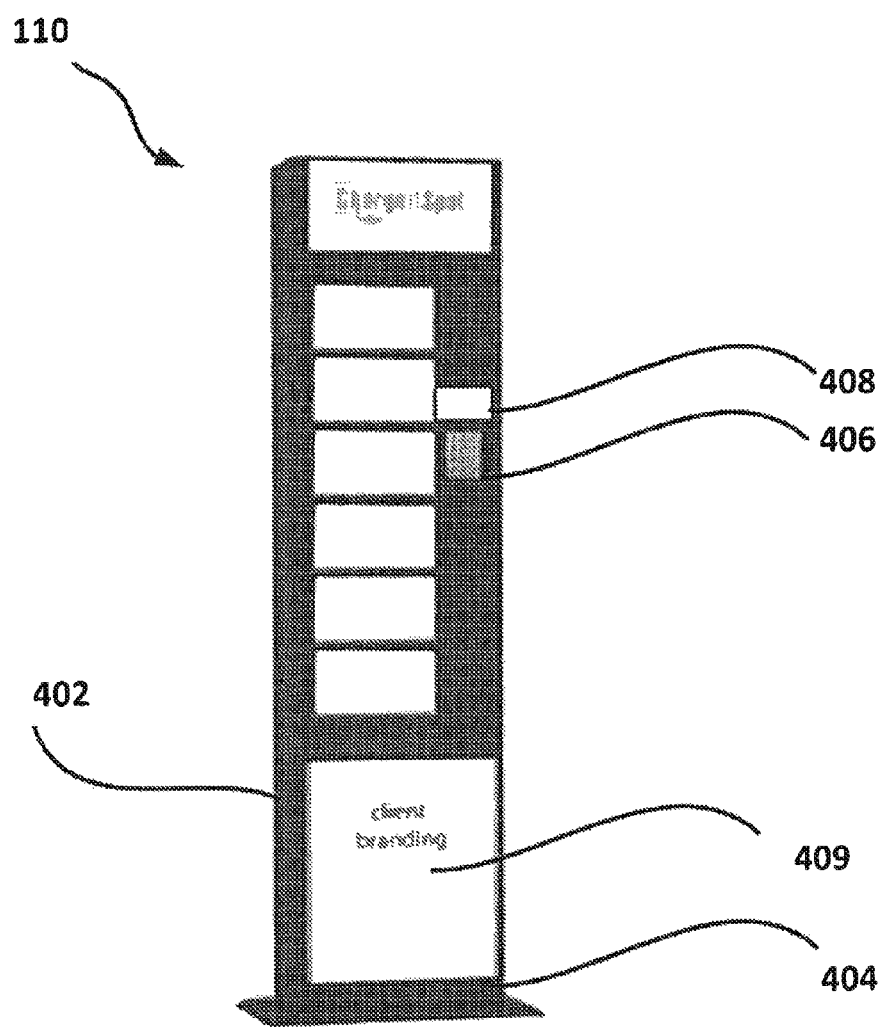
FIG. 4B illustrates another example of a mobile device charging station according to embodiments of the present invention.
Figure 4D:
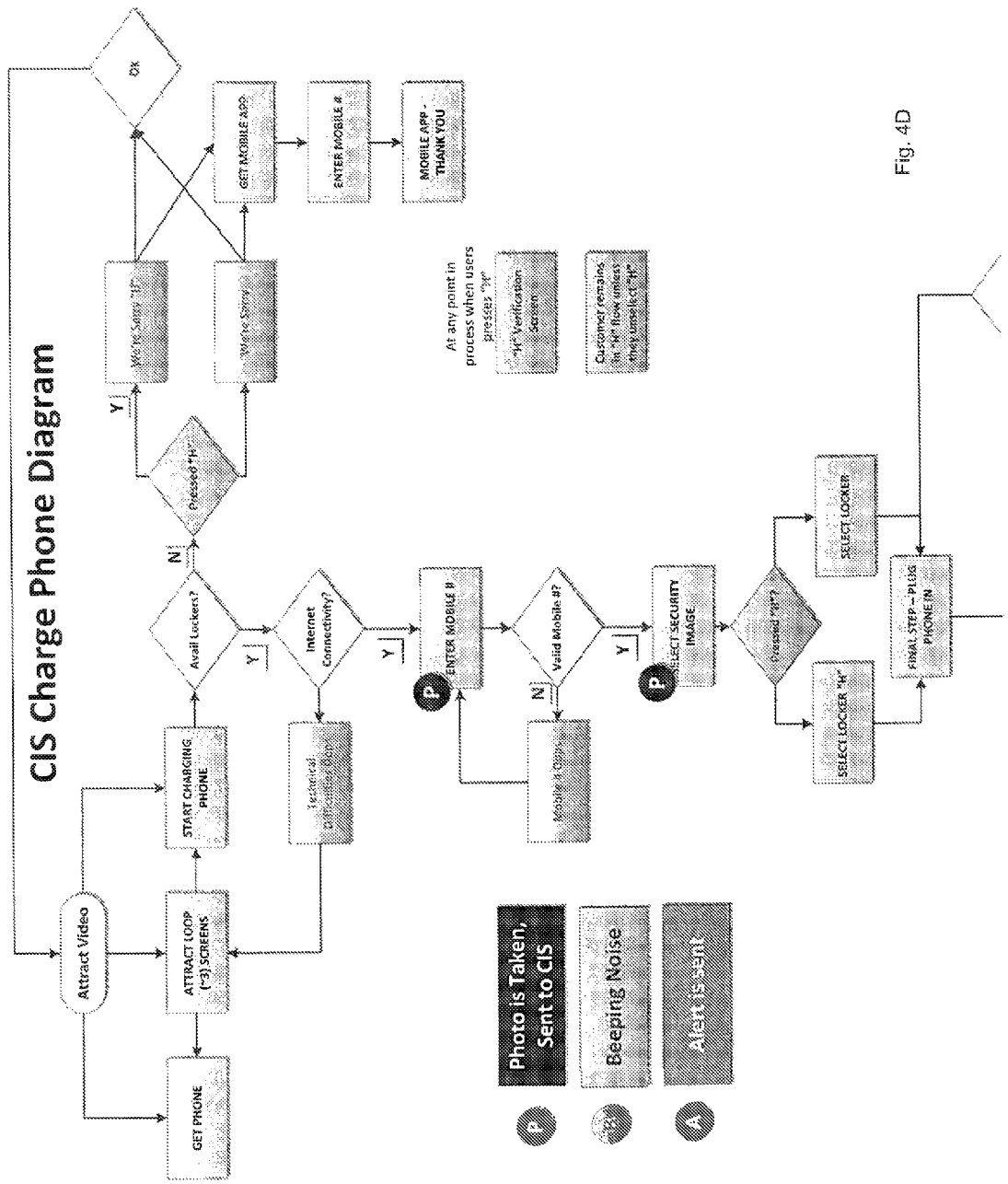
FIGS. 4D-G are flow diagrams illustrating the use of and exemplary charging station.
Figure 4E:
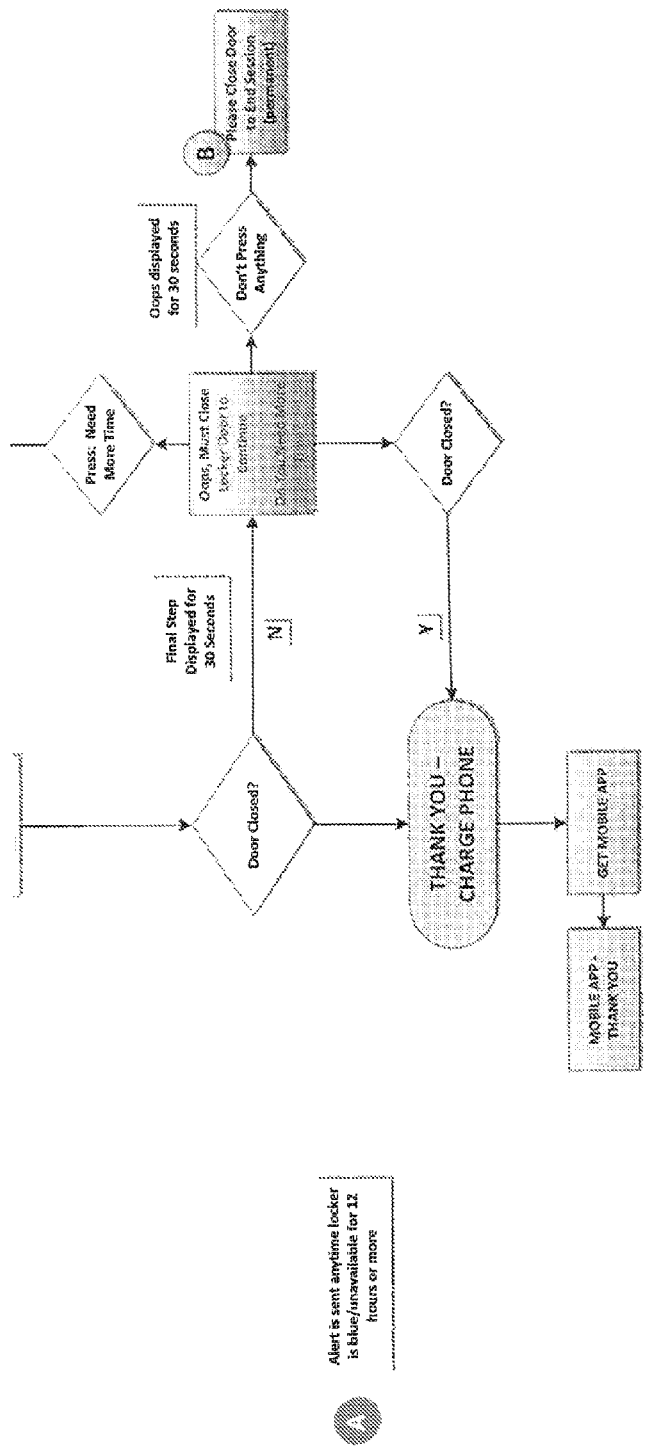

Referring now to FIG. 4B, another mechanism, which may allow for the collection of more user information, employs the use of a keypad 406 mounted to the housing 402. Coupled with a display 408 and microcontroller (not shown) connected to an electronic lock (not shown), a user may be provided with instructions and options for charging his or her mobile device 104. For example, the locker 407 may be preprogrammed by the microcontroller (not shown) to accept a certain number of any selected sequence of keys entered by a new user when the electronic lock is unlatched (i.e. the locker 407 is open). The microcontroller (not shown) may be configured to accept the same sequence of keys first entered by the user causing the lock to unlatch, allowing the user to remove his phone from the locker after use. This sequence of keys may also refer to user identifying information, such as the user's telephone number.

The display 408 may additionally or as the electronic "key," prompt the user for other identifying information for the collection and subsequent storage of user shopping information which may be valuable to retailers/registered businesses. For example, the display 408 may prompt the user to enter his name, a telephone number, a name and/or telephone number in conjunction with other information, such as a security "pin" having 2, 3, 4, 5, 6 or more digits, or the like.

By way of example, upon entering his name using the keypad 406, the display may prompt the user to enter his telephone number. It should be noted that other and/or additional user identifying information may be gathered as a part of these instructions. This gathered information may be used to serve several purposes. One purpose may be to provide verification information that the user is, indeed, who he says he is (such as by way of comparison to registered user information for system 300, by way of verification with information stored in the mobile application having associated therewith the aforementioned map and battery charge level capabilities, and/or by comparison with personal information on the mobile device, such as may be stored in association with the device's SIM card). Another purpose is to insure that only the user (or, an individual authorized by the user) is able to access the mobile device 104 from the locker 407 after the mobile device has been locked in the given locker 407. Yet further and as mentioned above, another purpose for the prompted user identifying information is to gather information about the user's shopping habits and/or frequented registered businesses, and/or other information as described hereinthroughout, which may be subsequently stored in user database 302 (as shown in FIG. 3).

Also, as a security feature, the display 408 may display an image of which a user has previously selected upon initially accessing an available locker. For example, the user may enter a telephone number, and then either select or be shown an image, such as a black dog. Upon returning to unlock the locker, the user may be prompted to enter his phone number, and then to select the appropriate image that matches the preselected image in order to unlock the locker.

It should be noted that any suitable type of user interface may be provided. For example, the user interface may be a part of a display 408, such as a touch screen liquid crystal display (LCD), and/or may include a display and a separate or discrete keypad 406. Moreover, it should be noted that any known methodologies of data entry may be employed, alone or in combination, including but not limited to a credit card or driver's license swipe, telephone number or other data entry to a keypad, a bar code or QR code scan, or a biometric scan, such as a fingerprint scan, for example.

In certain embodiments, upon entry of a telephone number, for example, the user may receive a SMS or MMS message (by way of non-limiting example) containing further information, as discussed throughout. For example, the user may receive promotional information, such as may be used upon reaching a business at which resides the charging units. The user may also receive a call to action, such as to download the mobile app discussed herein.

Another mechanism which may be employed for accessing and using the charging station 110 is a user interface 408 in the form of a card reader (not shown). The card reader (not shown) may accept any card identifying a particular mobile device user. The card reader (not shown) may be configured to accept a user credit card, a driver's license, or a consumer card issued by a particular retailer, by way of non-limiting example. In preferred embodiments, the card reading is for identification and/or data accumulation purposes, and may or may not be for the purposes of charging the user a fee for usage of the charging station. For example, the card reader (not shown) may comprise a magnetic card reader, which, upon swiping the user's card on the reader (not shown), may read the information contained on a magnetic stripe located on the user's card, enabling the charging station to gather and process user identification information, such as for secure access by the user to his device after charging, and/or to accumulate information about the user, such as shopping habits of the user, which, as mentioned above, may be stored by user database 302.

FIG. 4C illustrates an example of an open locker of the charging station 110 of an embodiment of the present invention. As shown, multiple interfaces and/or universal interfaces 410 may be located inside each locker 407 provided for recharging a given mobile device 411. Each interface 410 may be a unique type of charging interface, may be dedicated for a particular make or model of mobile device, or may be a universal charging interface.

Still referring to FIG. 4C, in some embodiments of the present invention, these interfaces 410 may also provide another mechanism used to gather user and user shopping information, as these interfaces are typically communicatively linked to the user's mobile device 104. Thus, user information stored on or linked to the mobile device 104 may be gathered, via the interface, if accessible to the charging station 110. It should be noted, however, that different information will be accessible based on different types mobile devices and mobile device security level, as one of ordinary skill in the art understands. For example, one skilled in the art will appreciate that the present mobile application resident on the charging mobile device may have access to that information on the device that would typically be available to an application developer (developing applications as part of systems according to embodiments of the present invention) via the application programming interface ("API") for that device and device type. The above described locker access is further illustrated in FIGS. 4D-G.

Figure 4F:
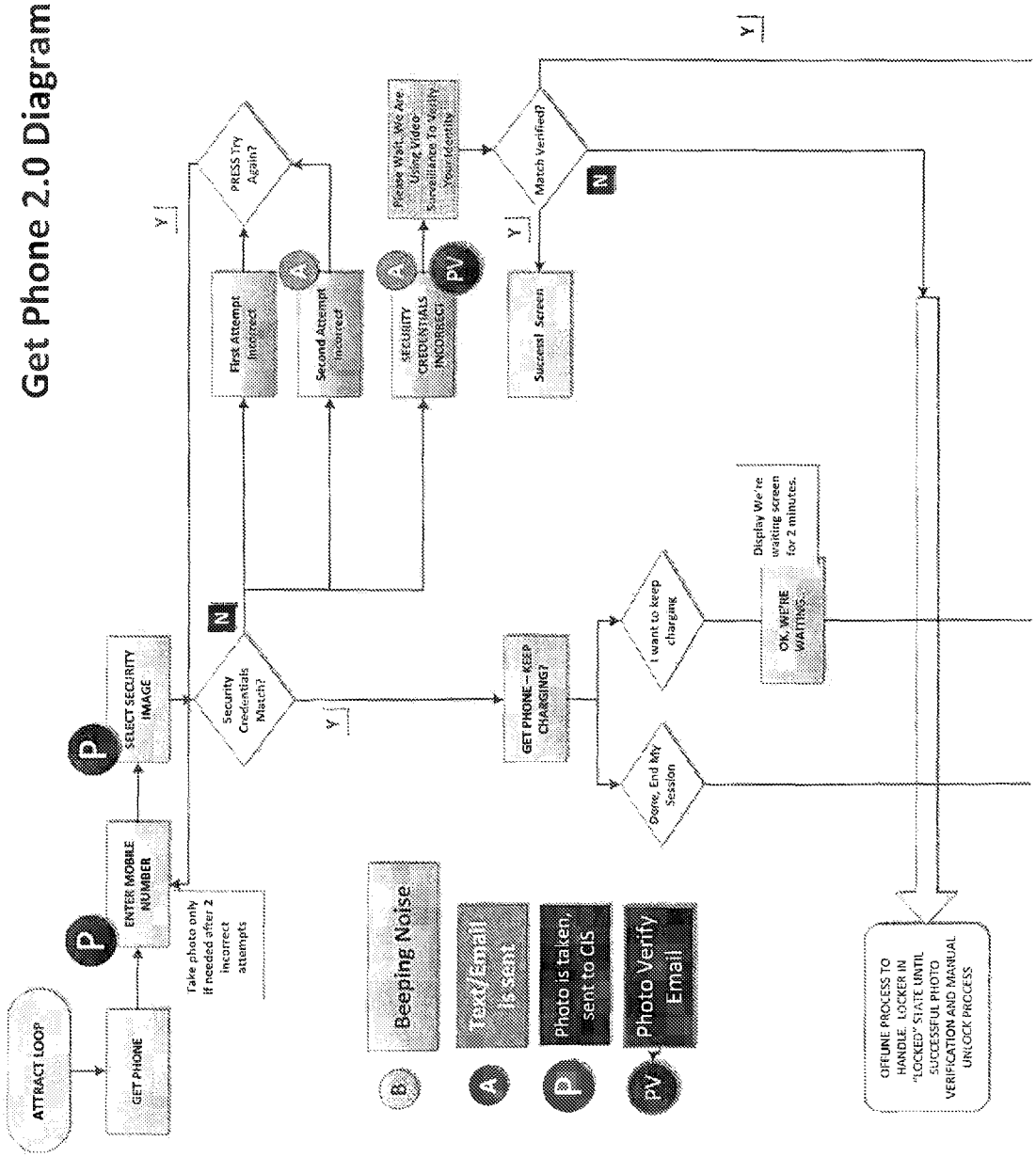
Figure 4G:
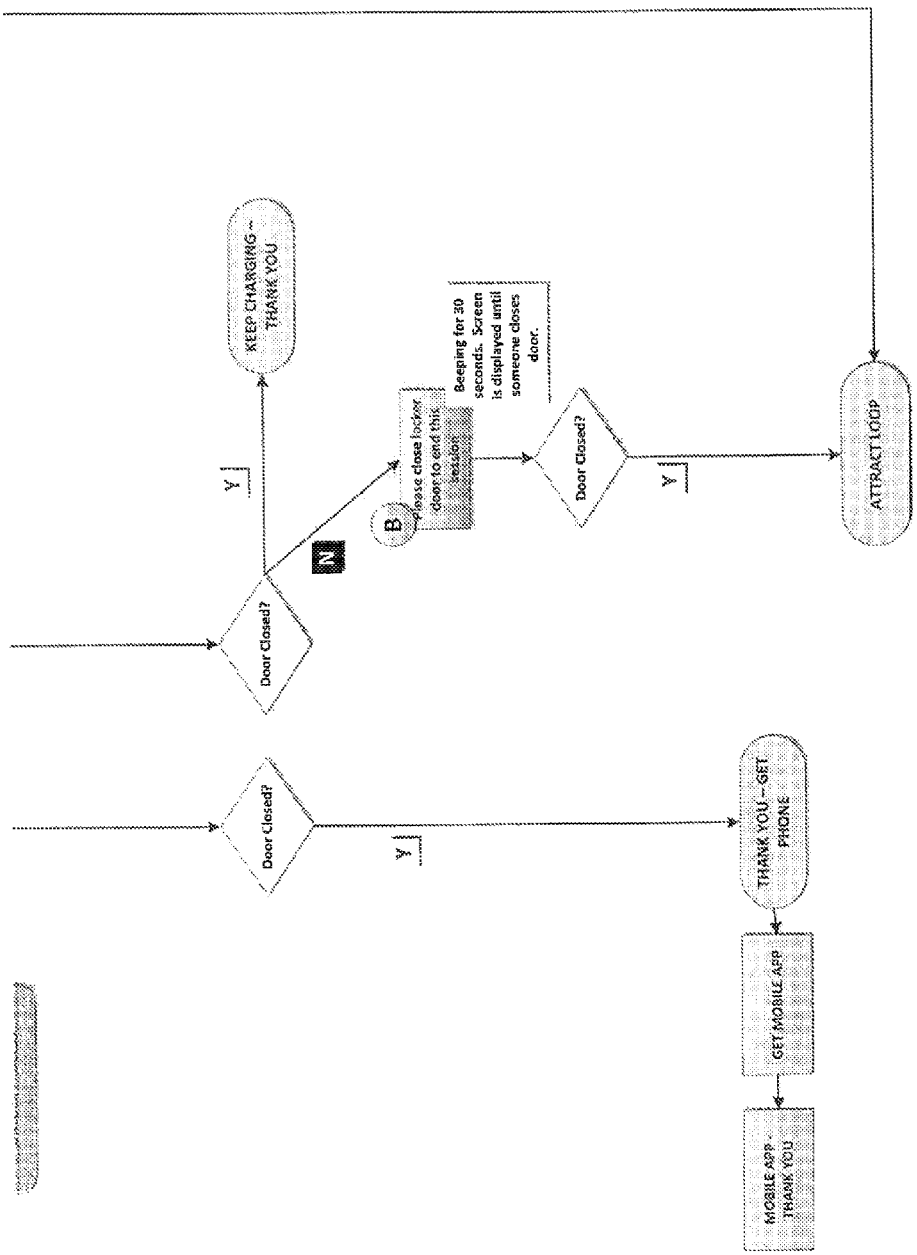

In at least one embodiment, in reference to FIG. 4F, provides a PhotoVerification process of a user of the system (i.e. kiosk). If a user's initial security credentials are incorrect (i.e. "First Attempt Incorrect," "Second Attempt Incorrect"), then the kiosk can use a series of photos and/or a Voice over IP conversation directly with the user to manually and/or via facial recognition software verify the user's identity ("Please Wait, We Are Using Surveillance Records To Verify Your Identity"). If a match is determined to be made ("Match Verified?") then the user receives a Success!

screen and the process continues to FIG. 4G. If a match is not made ("N"), then the process proceeds to an Offline process, or locked state, until a successful verification (photo or otherwise) or a manual unlock process is performed.

In further embodiments of the invention, photo or video records of users may be stored remotely, such as on an administration server which is accessed during the Photo-Verification process set forth herein. The administration server securely stores the user records and makes the user records available on an as-needed basis utilizing secure communication lines. The processing power of a centrally located admin server is considered far greater than the processing power of the charging station, or kiosk, therefore the verification process time is much quicker and results in improved overall user satisfaction. In the event that a secure connection cannot be established with the administration server (i.e. an Internet connection is down), the authentication process for PhotoVerification would be halted and a user would be prevented from initiating the charge phone process. The lockers of the kiosk may detect when an actual phone or device is attached to a charging cable located within the locker. Via remote control, such as from a command interface located at the administration server or some other remote location, lockers of the kiosk may be unlocked or locked. Each locker may be configured to include interior lights, like LED lights, for personalization purposes. The actual LED colors and/or configuration may be controlled as well from a remote location or associated with specific device users.

In another embodiment of the present invention, the invention may provide a notification process. The notification process would be initiated upon the completion of a device being charged fully. Users may be notified in a myriad of different ways, including, but not limited to, SMS text message to another phone, email, or the like.

Once a device is attached to the cable, a negotiation process is undertaken, termed the OptiCharge process. In this embodiment, the charging board of the system automatically determines phone or device characteristics (model, battery) and may alter the charging process based on this information. For example, the charging board may be pre-programmed with information pertinent to the device, or may retrieve the information from an external server. Based on this information, the charging process can provide the optimal amount of current to best charge the phone in the shortest amount of time.

In further embodiments of the invention, when a Photo-Verification process is completed and a user is considered to be authorized and the locker is unlocked for use, the locker may undergo a "clear" process. A clear process would be necessary in the event that a phone or device is detected to have not been connected to a charging cable, or the like. A clear process would be initiated after a certain time, or timeout, a variable which could be set to a certain number of minutes (e.g., 5 minutes).

Loyalty Programs

Users may choose to enroll in user loyalty programs. Users may choose to enroll via the charging kiosk utilizing a graphical user interface provided at the kiosk. The loyalty program enrollment information may be stored in conjunction with the user information stored at the administration server, or the like. Further, via the graphical user interface, a user of the system may participate in completing surveys or polls.

Figure 5A:
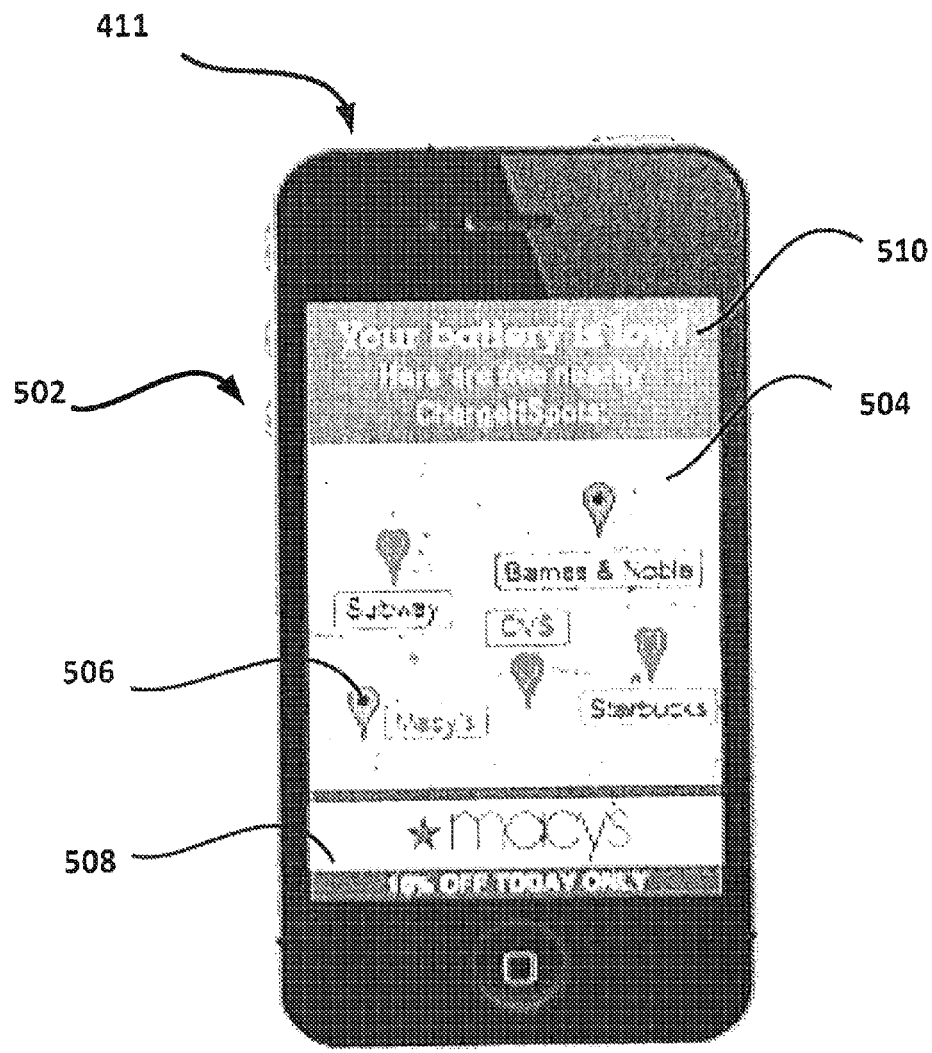
FIGS. 5A-E illustrate exemplary map displays on a mobile device according to embodiments of the present invention.
Figure 5B:
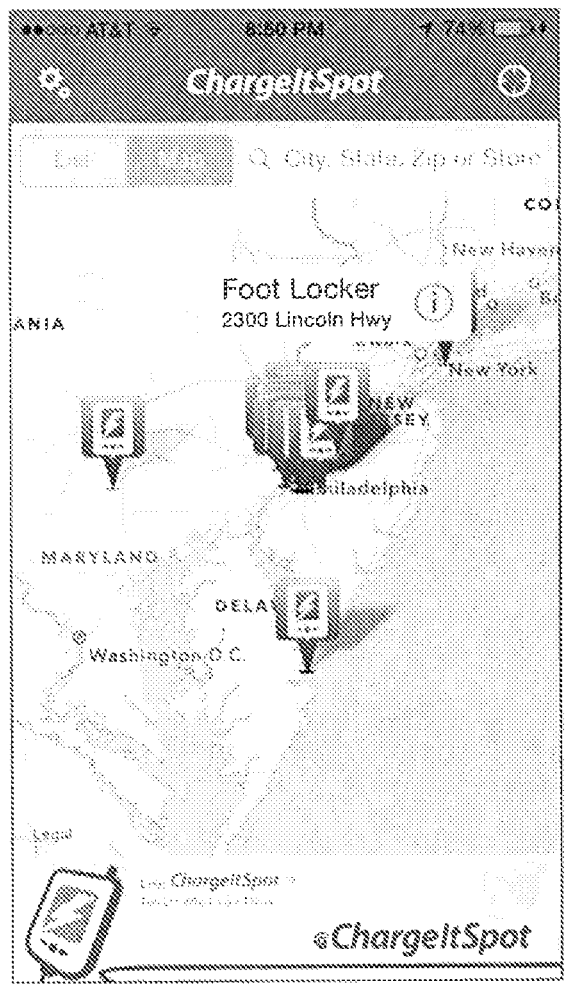

FIGS. 5A and 5B illustrate examples of a map displayed on a mobile device, such as by a mobile application associated with the disclosed systems and methods. As shown in FIG. 5A, for example, the mobile device has a display screen 502. The server (not shown) may access the mobile application on the device, such as upon sensing by the mobile application on-board that battery power has fallen below the predetermined threshold, and causes the display of a map 504 on the display screen 502. The map may populate with certain icons 506 superimposed thereon, such as for denoting the location of certain available charging stations and/or registered businesses having charging stations to the user, and/or how many charging units are available (if any) at a given location. By way of non-limiting example only, a large upside-down "teardrop" icon may denote the location of a charging station 110 with at least one locker currently available for charging. Also displayed on the display screen 502 may be a notification area 508, in which the mobile application may notify the user that his battery power level has decreased to a predetermined level, and that the battery may need to be recharged soon to maintain operation of the mobile device. As shown, the notification area 508 may be located above the map.

Figure 5C:
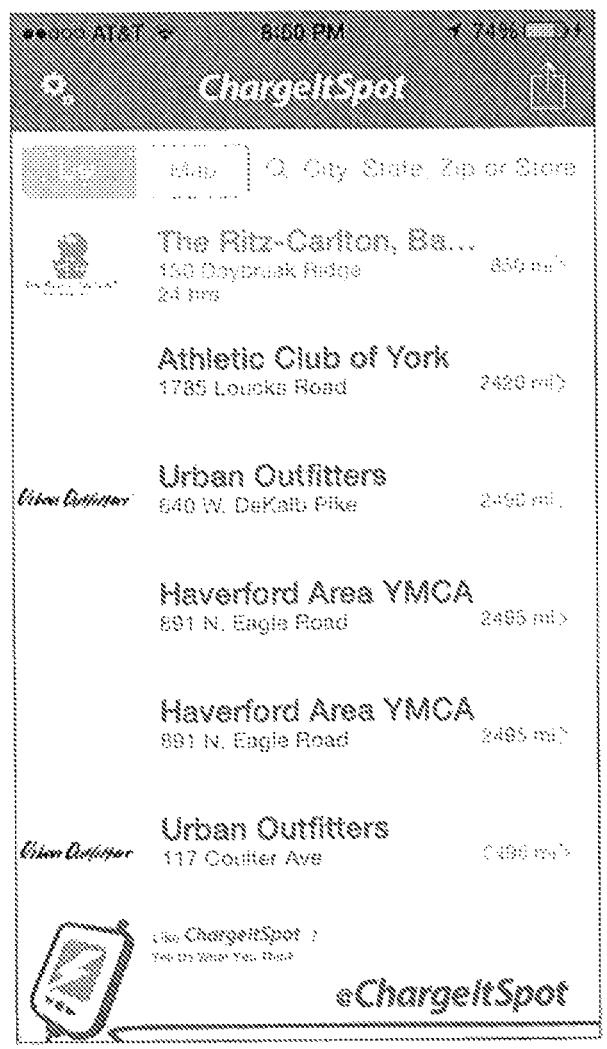

However, embodiments of the present invention are not so limited, as the notification area 508 and/or map may be of any known type, may be tiled or "windowed" in any manner, and/or may be located anywhere on the display screen 502. In an embodiment of the present invention, as illustrated in FIG. 5C, the user may toggle between the map view discussed herein and/or a list view of location which may more clearly identify the most convenient location for the user. Such a list view may, for example, note the distance between the user and the provided locations and may be sorted, for example, from closest to furthest from the user geographically. Similarly, using traffic reporting systems known to those skilled in the art, the sorting may also account for travel time due to road conditions and may sort accordingly.

As further illustrated in FIG. 5C, ads may be served within aspects of the GUI and may, for example, be served with a list of possible locations. In an embodiment of the present invention, the served ad may be in the form of a banner ad. The served ad may be used to self-promote features and services provided by the present invention and/or may be sold to third parties. Third party ads may be associated with one or more identified locations and may pertain to that location's particular goods/services offered for sale. For example, a location having a charging station 110 may be predominately in the business of selling shoes, and, more particularly, athletic shoes, and may pay for the delivery of an ad promoting its business and/or offering a coupon for the purchase of shoes. Such a promotion may, for example, offer an additional discount/incentive based on use of the charging station 110.

As would be appreciated by those skilled in the art, ads may also be delivered based on location and may be dynamically delivered based in user attributes. For example, an ad may be served according to the proximate of a user to a location where the ad may be relevant, whether or not the relevant location and/or ad is related to a charging station 110 location. Similarly, an ad may be served based on the type of phone used by the user and/or the apps loaded thereon or browsing history. For example, the app of the present invention may query the bookmarks or other internet browsing activity logged on the user device and may use that information when serving an ad.

As would be appreciated by those skilled in the art, ads may be scheduled with a start and end date over a specific time period. The use of revolving and/or multiple ads may be presented to a user and may, for example, create a user specific "playlist". Such ads may be configured as an attribute in such programs as KioWare, for example (e.g., MobileAdsCatId attribute).

Figure 5D:
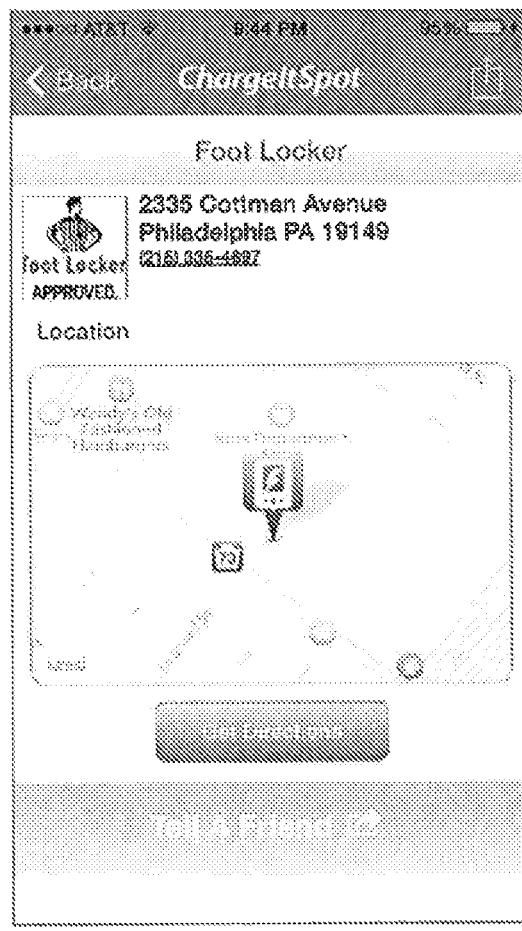

Any selection of a location, whether by selection of a graphically presented location, a listed location name, and/or automatically delivered to the user, may include a detailed map representation and/or the option to obtain directions to the selected location, as illustrated in FIG. 5D. Information provided may also include location details, including contact information, and may allow for the sharing of the location information with other contacts through convention communication means, such as email and texting, for example, and through social networks, such as Facebook, for example. As would be appreciated by those skilled in the art, obtaining directions to the selected location may include launching a GPS aided mapping app which may be resident on the user device, such as, for example, MapQuest or Google Maps, which may give "turn-by-turn" directions to the user.

Figure 5E:
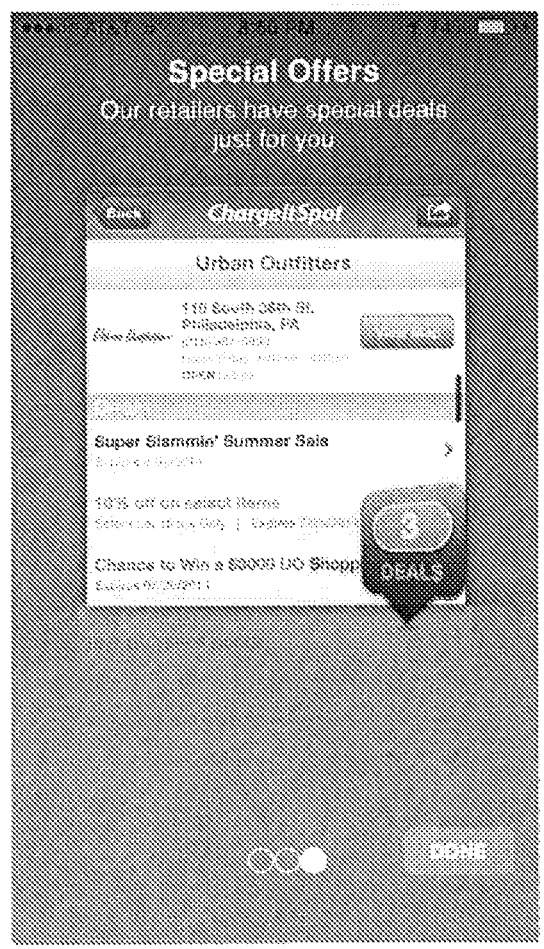

According to exemplary embodiments, advertising content 510 may also be provided to the user on the display screen 502, such as via the mobile application. The advertising content 510 may include instructions on how to take advantage of special offers or deals mentioned in the advertising content 510. For example, upon reaching a charging location, the user may, either prior to recharging or upon at least partially recharging his device at the participating location, show or play (e.g., in the case of audio-based advertising content) the advertising content on the mobile device to the cashier or other staff at the advertised location, such as to obtain any advertised prices, offers or deals, and/or to be given a coupon or the like. In other embodiments, as illustrated in FIG. 5E, the mobile device user may only have to mention that they received advertising content 510 to receive any relevant special offers. In still other embodiments, the user may be given a code, such as a numeric code, a keyword or password, or other like indicator that, once passed to a cashier or store personnel, indicates to the store personnel that the user has indeed received a special offer on his device to use a charging station at that store. In yet further embodiments, upon accessing the advertisement and/or upon reaching the charging location, a credit, such as may be accessible only in the event of a purchase, may be added to a shopper's card, store card, credit card, user account, or the like of that user.

Additionally, in some embodiments, advertising content 510 may include an indication that the mobile device user is already heading toward, or is likely to pass, an advertised location. In other embodiments, advertising content 510 may include directions to the advertised location, and/or may link to a website of the location upon accessing by the user, for example.

Situations may arise where multiple nearby businesses may house a charging station, thus driving competition for the user's "foot traffic," and/or for advertising content space (and/or business location recognition by icon 506) on the user's mobile device display screen 502. Therefore, the server (not shown) may employ a prioritization algorithm to determine which participating business or businesses gets to provide an advertisement (and/or location recognition by icon 506) at any given time and location of the user's mobile device, and/or in what order advertisements are listed, displayed, or preferentially listed or displayed. This prioritization algorithm may be based on any number of factors, which may include, for example, user shopping characteristics and a known relation (such as a known preference) to the items of a participating business or business type, the relative location of the user and participating business, the level of participation of the participating business in the disclosed systems and methods (e.g., the fee amounts paid to house a charging station, paid for user access via the mobile application, paid for user data access and/or accumulation, or the like), and the like. It should be noted, however, that these factors should not be so limited, as the prioritization algorithm may apply other information related to consumers or businesses to determine the advertising content (and/or location recognition by icon 506) to be displayed on the display screen 502 at any given time.

Figure 6:
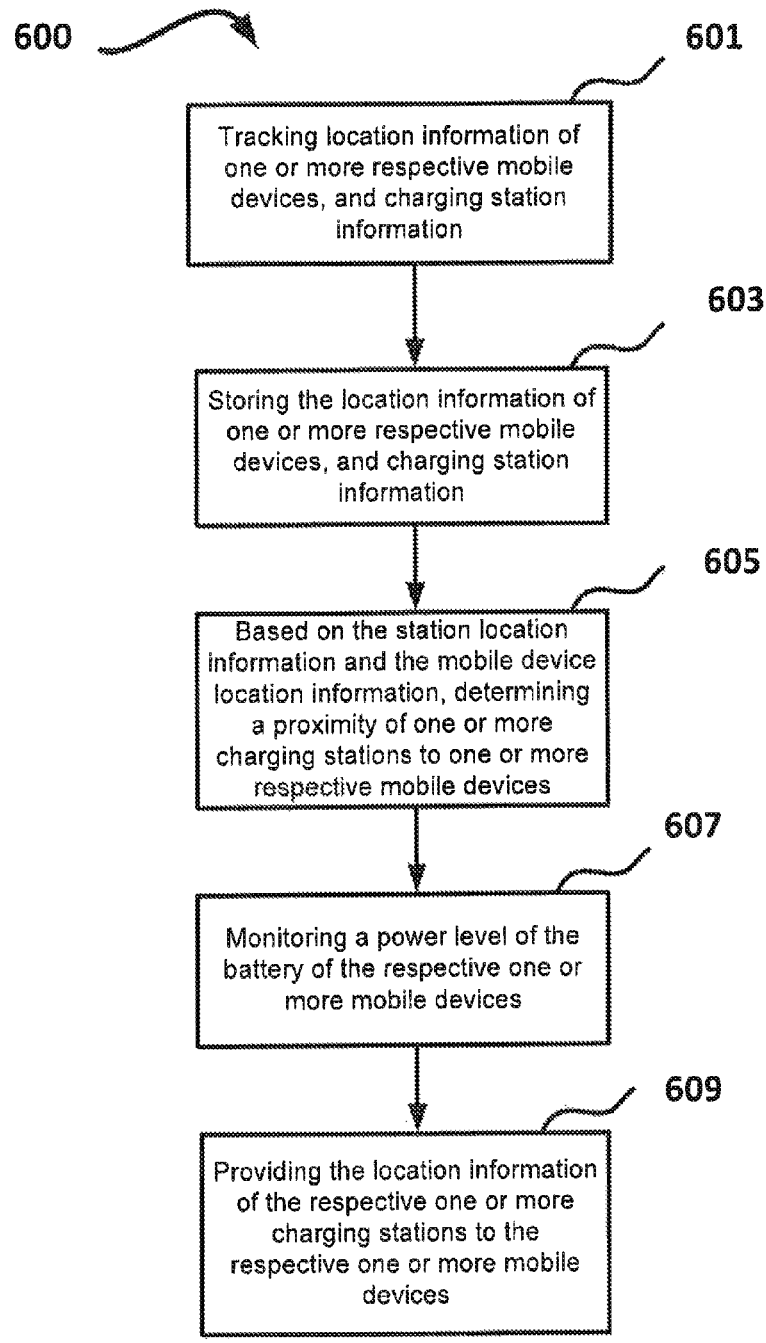
FIG. 6 is an exemplary method employed by the system according to embodiments of the present invention.

In accordance with one or more embodiments described herein, and with reference to FIG. 6, there is shown a methodology 600 operable by a system according to embodiments of the present invention. It is noted that numbers associated with the blocks of FIG. 6 do not imply a particular order in which the corresponding steps are to be performed according to the method 600.

In FIG. 6, step 601 includes tracking location information of one or more respective mobile devices, and charging station information. Step 603 includes storing the location information of one or more respective mobile devices, and charging station information. Based on the station location information and the mobile device location information, determining at step 605, a proximity of one or more charging stations to one or more respective mobile stations. Step 607 may include monitoring a power level of the battery of the mobile device. Step 609 may include alerting a user of the mobile device and providing the location information of the respective one or more charging stations to the mobile device. The location information may be provided to the mobile device based on a power level of the battery of the mobile device decreasing to a certain power level and/or based on a determined proximity of one or more charging stations to the one or more mobile devices.

Figure 7:
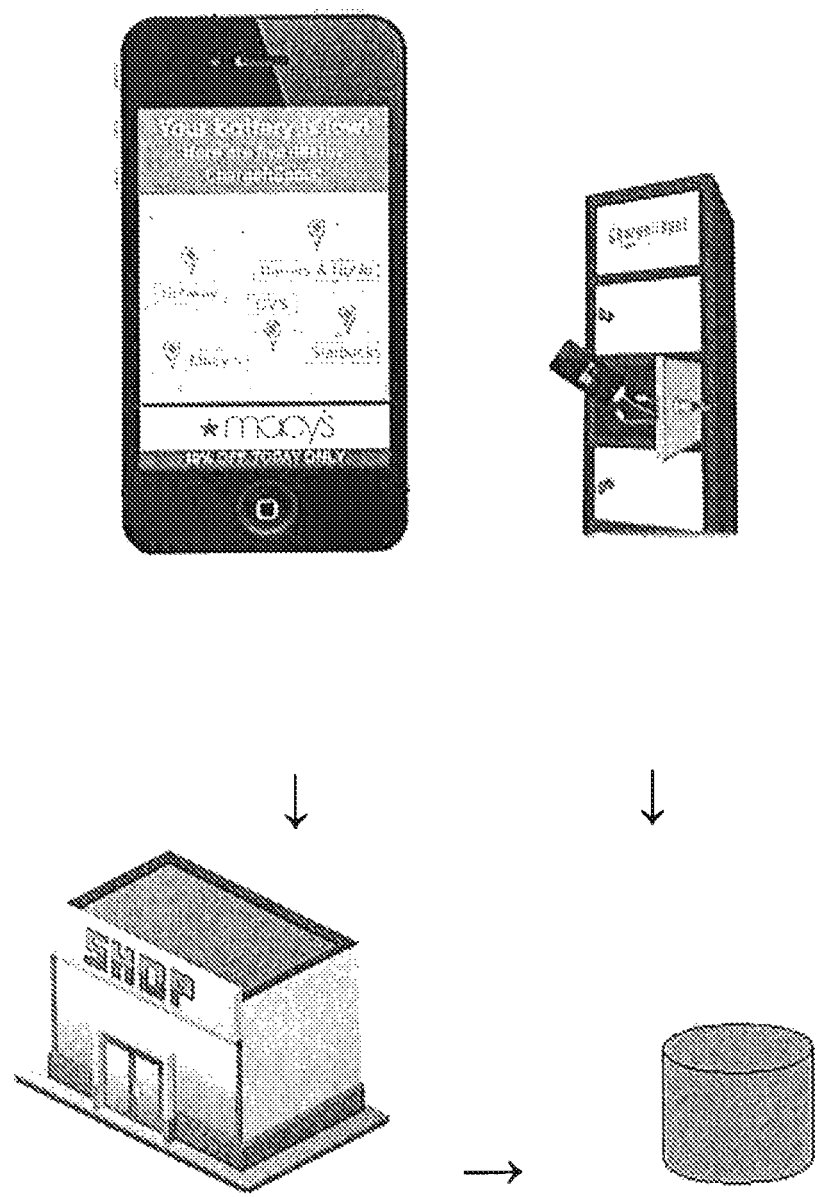
FIG. 7 is an exemplary embodiment of the present invention.

In accordance with the foregoing, and as illustrated in FIG. 7, the disclosed embodiments may provide a network, such as may be formed by the disclosed charging stations, registered (or unregistered) businesses (which, although shown in the figure as a "shop," may be any type of public or private business), and mobile devices, and, more particularly, as between communicative interconnectivity, advertisers, and user mobile apps. In an example of the disclosed systems and methods, a user may download a mobile app to his device, and may set a 20% level for battery recharging—meaning the user will receive an alert from the mobile app once his phone has less than a 20% battery charge.

By way of non-limiting example, after charging his phone for the first time, the user may be auto-prompted to download the mobile app. Further, the mobile app, and/or participation in the disclosed systems and methods, may be free for consumers, and available for a monthly fee to the registered businesses. Alternatively, a fee may be charged to consumers, or a charge to consumers may be affected by consumer actions. For example, a user's willingness to accept/view/watch one or more advertisements or promotions may cause a modification, such as a decrease or elimination of, any fee due from consumers for the mobile app, the mobile app services, or the charging services. Moreover, the present invention may be free to some businesses, such as those willing to sponsor or host charging units, but may be available at a fee to other businesses.

By way of further, non-limiting example, the charging units/kiosks/lockers discussed throughout may be placed in a registered business subject to, for example, payment of rent. This and other costs to the charging unit provider may be recouped by charging consumers for the services discussed, by accepting sponsorships, by accepting advertisements or promotions to be provided to consumers (which may be from the registered business ultimately used by the user and/or from other registered businesses and/or sponsors) for a fee, and the like. Additionally, payment may be received for other occurrences, such as revenue sharing. For example, a credit card company, such as VISA, may sponsor a kiosk, and thereby the kiosk may be free to use for consumers who swipe a VISA card. For users who do not hold a VISA card, the use of the unit may be free to those consumers if they agree to apply (such as conveniently through an electronic interface at the kiosk) for a VISA card. Upon receipt of an application for a VISA card, VISA may pay a fee to the kiosk provider.

Continuing with the foregoing example, upon receiving a recharging alert, the mobile app may provide the user with a map or similar interface showing local charging stations having charging units available to the user. Further, the mobile app may provide, such as on the map, or in a list or secondary window in conjunction with the map, an indication of ones of the registered businesses with local charging available and which are making special offers, such as sales, coupons, targeted offers based on the user's history (in the mobile app and/or on the device more generally), and/or unique deals for users of the present invention.

Those skilled in the art will appreciate, in light of the disclosure herein, that the aforementioned mobile app may serve principally or exclusively to monitor a mobile device charge, and alert a user to a need for recharge, i.e., the disclosed mobile app may be a stand alone mobile app for alerting a user to a low device batter charge. Such a mobile app may provide the alert when the battery charge falls below a predetermined threshold, which threshold may be preset or entered by the user, as discussed herein.

Returning now to the foregoing example, once the user selects one of the registered businesses, the user may seek out and/or be directed to the selected business. Upon arrival, the user may or may not be provided with advertising at the charging station, such as by a display associated with the station. Further, the user may be asked, such as via the same display or via a second display, to enter user information to secure the user's device once placed into a charging unit. Additionally or alternatively, the charging unit may secure the device by a physical key.

Via any user-entered information, and/or via any information gained from the phone through the communicative plug of the phone upon recharging, and/or via a profile entered by the user (such as into the mobile app), and/or via the user history, a user profile may be created. For example, redeemed deals and special offers made in the mobile app may be tracked by the disclosed system as an indication of user product and service preferences. The profile may be maintained by the system discussed above, and may allow for targeted marketing, both of the charging services discussed herein, and of third-party goods and services, such as those provided by the registered business and/or by other businesses. For example, geo-targeted ads may be offered via the mobile app.

Further, the user's time in-store is thereby increased as the user shops while awaiting a recharge. The user is also provided with a differentiated, enhanced customer shopping experience that increases consumer loyalty.

Moreover, the accumulation of user data and profiles, such as including user shopping data, provides the aforementioned and other data mining opportunities through the use of the present invention. For example, the accumulation of data may be indicative of users' usage of GPS, and/or GPS-invoking apps, and the affects thereof on battery life. The accumulated data may also indicate battery life by device type, by usage type, or the like, and may thus serve as a research tool for device manufacturers, or as a purchase tool (to the extent the information is publicly available) for a user and/or for a non-user. Of course, availability of such recommended purchase data only to users of the mobile app may drive non-users to obtain the mobile app.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium, and preferably on a non-transitory computer-readable medium. Computer-readable media includes both computer storage media and communication media including any medium that facilitates transfer of a computer program from one place to another. A storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 8:
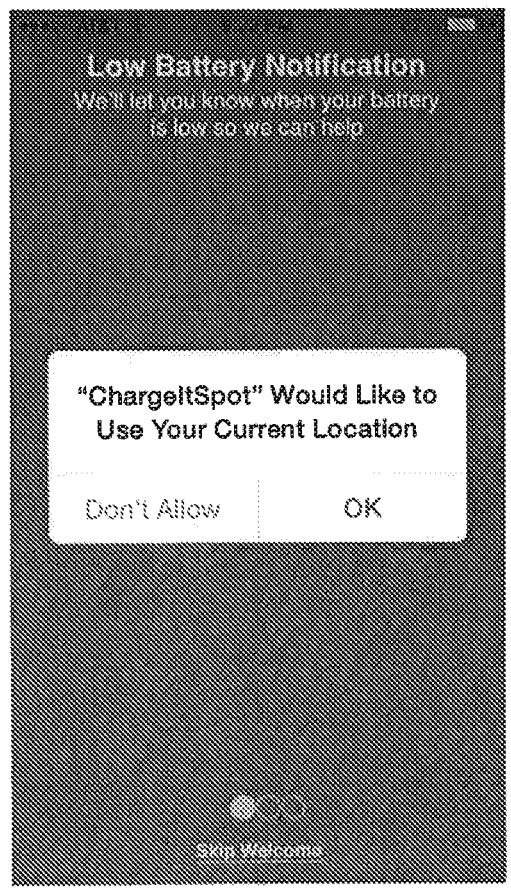
FIG. 8 is an exemplary embodiment of the present invention.

As illustrated in FIG. 8, a graphical user interface ("GUI") associated with the present invention may be provided through an app which may be obtained through any convention means, such as through an app store, for example. Although certain features offered through the GUI may be activated and/or deactivated by the user at any desired time, the app may prompt the user to allow for location based services to provide the most useful user experience in relation to the features described more fully herein.

Figure 9:
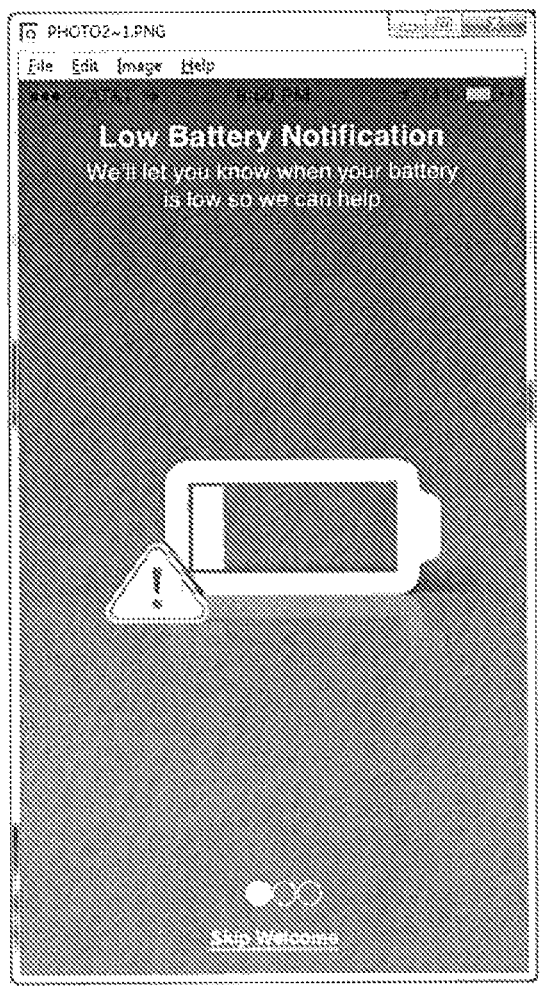
FIG. 9 is an exemplary embodiment of the present invention.

The GUI may provide an indication of the charge capacity and the charge remaining in at least one battery and/or battery cell, associated with mobile device 104. The GUI may also include indicators as to page and/or content amount and the location of the user among such options. For example, as illustrated in FIG. 9, pagination of the GUI may be exemplified by the use of small circles which may allow the user to more easily navigation between screens of the GUI. Although many forms of navigation may be used, in a preferred embodiment, the user may toggle between GUI pages by swiping to the left and/or to the right.

Figure 10:
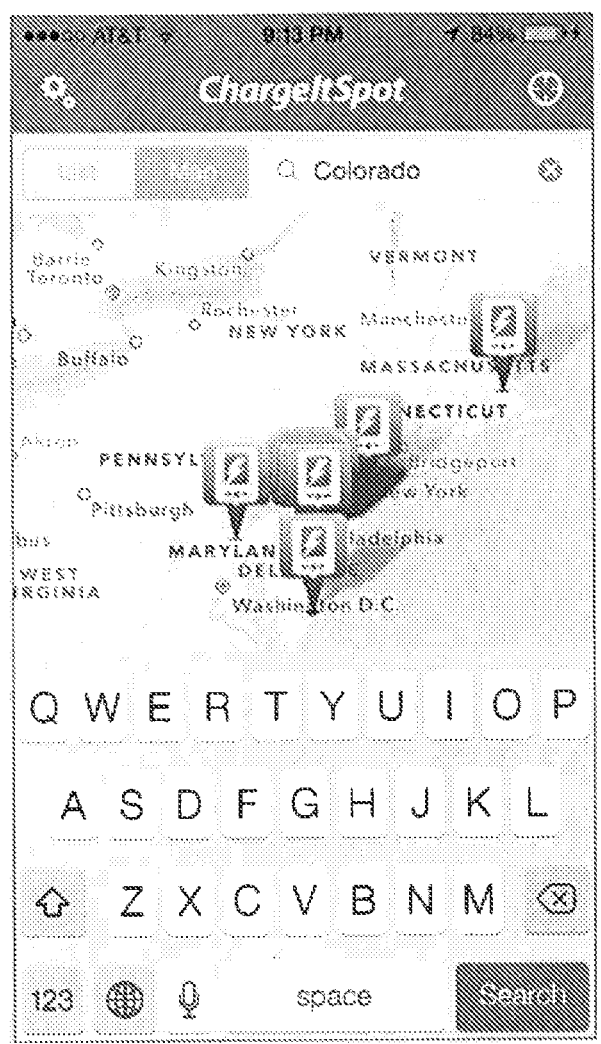
FIG. 10 is an exemplary embodiment of search functionality of the present invention.

As illustrated in FIG. 10, search functionality may be presented through the GUI and used to identify the closest charging location to the user. If, for example, there are not locations within a defined range of the searcher, which range may be predefined or set by the user, the app may collect that information and allow such information to be collected by a third party administrator to inform the administrator of user desired locations. Similarly, such information may allow for the delivery of ads based on the users location and may allow for the delivery of ads outside the network of ads related to charging locations. Furthermore, a user may select a proximity distance which may be selected from a list having ¼ mile, ½ mile, 1 mile, 2 miles, 5 miles, and/or 10 miles as choices.

Figure 11:
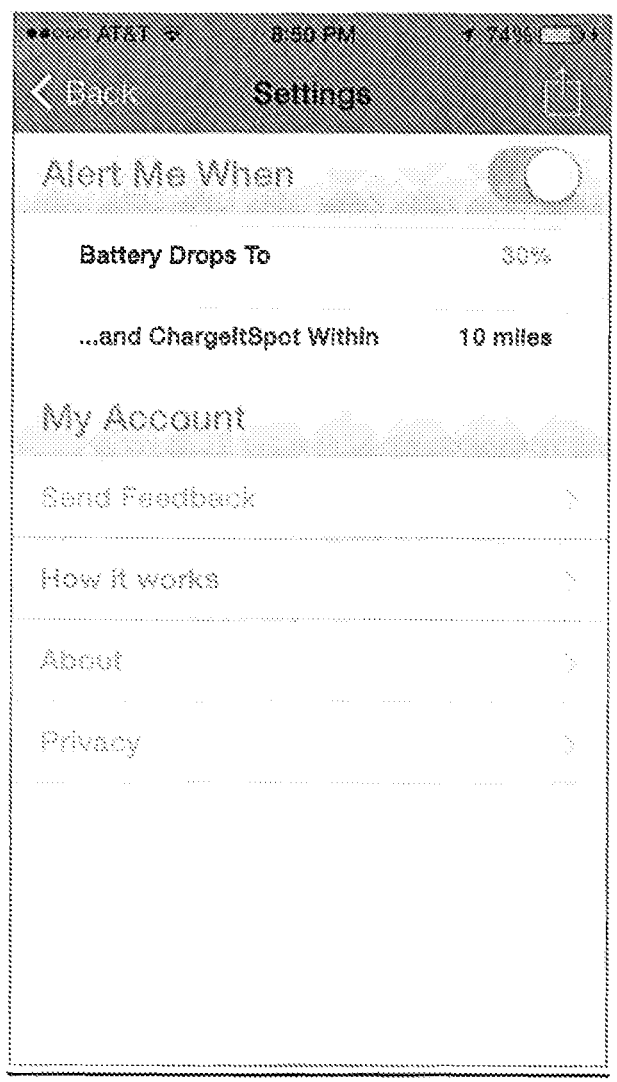
FIG. 11 is an exemplary embodiment of the present invention.
Figure 12:
FIG. 12 is an exemplary embodiment of the present invention.
Figure 13:
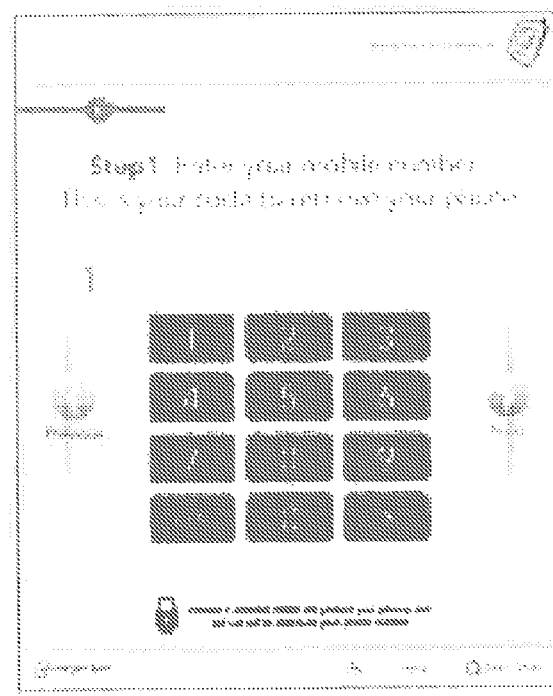
FIG. 13 is an exemplary embodiment of the present invention.
Figure 14:
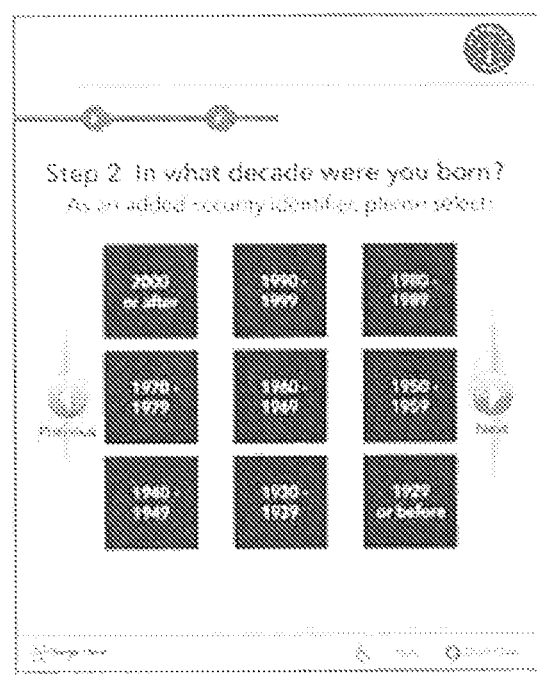
FIG. 14 is an exemplary embodiment of the present invention.
Figure 15:
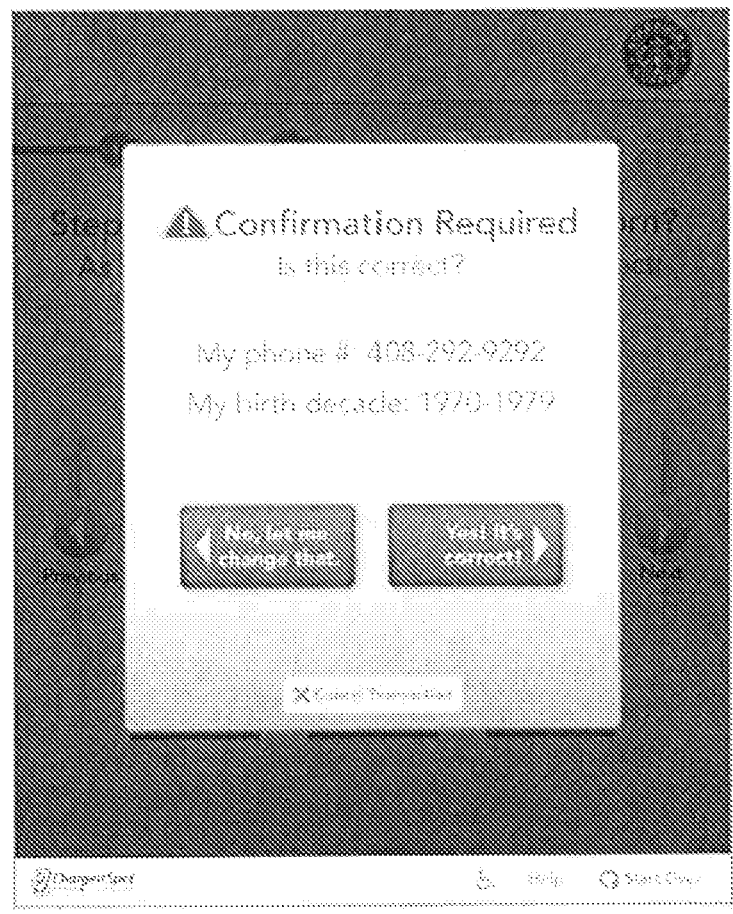
FIG. 15 is an exemplary embodiment of the present invention.
Figure 16:
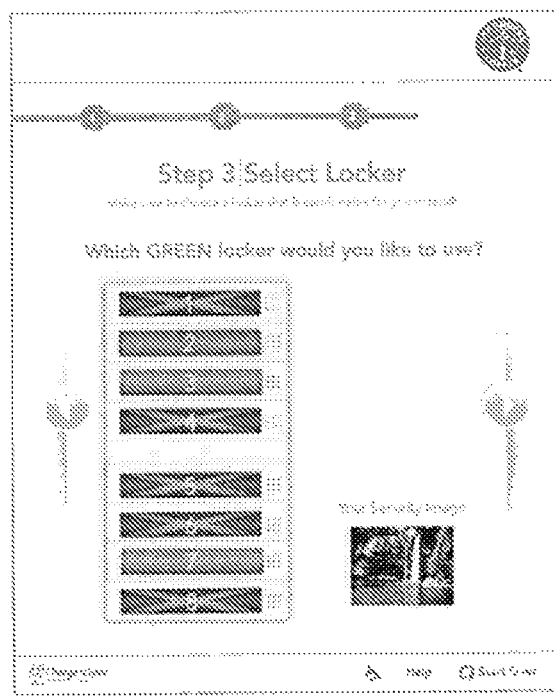
FIG. 16 is an exemplary embodiment of the present invention.

As discussed herein, the charging status of the phone may be brought to the attention of the user and, as illustrated in FIG. 11, such alerts may be customized by the user. The user may activate and deactivate any alerts and may, for example, select a desired level of battery charge for which an alert may be triggered. For example, a user may choose that an alert as to battery life by presented when at least one of the batteries has only about a 30% charge remaining. Although any level of charge may be used to activate an alert, a user may select between 10% and 80% (default is 30%), preferably in increments of 10%. As would be appreciated by those skilled in the art, a battery may fluctuate over time and the percentage charge may be considered an approximation rather than an absolute direct measurement of remaining charge.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. A publicly available mobile device charging system comprising:
    one or more charging stations configured to charge a battery of a mobile device;
    a database configured to store:
        station location information of the one or more charging stations;
        mobile device location information of the mobile device; and
    a server communicatively coupled with the one or more charging stations and the database, the server being configured to:
        based on the station location information and the mobile device location information, determine a proximity of the one or more charging stations to a location of the mobile device; and
        based on the determined proximity, provide the station location information of the respective one or more charging stations to the mobile device;
    the one or more charging stations further configured to:
        display to a user of the mobile device a prompt to receive security credentials
        verify the user of the mobile device using video or photo data in response to incorrect security credentials.

2. The system of claim 1, wherein the server is further configured to:
    monitor a power level of the battery of the mobile device;
    based on the battery level reaching a predetermined threshold:
        alert a user of the mobile device to the battery level; and
        provide the location information of the respective one or more charging stations to the mobile device.

3. The system of claim 1, wherein the station location information comprises availability status of lockers associated with the one or more charging stations.

4. The system of claim 1, wherein the server is further configured to:
    collect entity information associated with entities sponsoring one or more of the charging stations.

5. The system of claim 4, wherein the database is further configured to:
    store user information associated with the user of the mobile device, wherein the user information comprises user's security credentials and video or photo data associated with the user; and
    entity information associated with entities sponsoring the one or more charging stations.

6. The system of claim 5, wherein the server is further configured to provide the entity information to the respective one or more mobile devices.

7. The system of claim 6, wherein the entity information provided to the mobile device is based on a prioritization algorithm.

8. The system of claim 5, wherein the verifying further comprises taking a photo or video of the user; and
    comparing the photo or video to the video or photo data associated with the user as stored on the database.

9. The system of claim 8, wherein the user is granted access to the charging station in response to a match being made in the comparison.

10. The system of claim 8, wherein the charging station is placed into a locked state in response to a match not being made in the comparison.

* * * * *